United States Patent
Kawaguchi et al.

(10) Patent No.: US 7,030,182 B2
(45) Date of Patent: Apr. 18, 2006

(54) RUBBER-REINFORCING GLASS FIBER TREATMENT AGENT, RUBBER-REINFORCING CORD USING THE FIBER TREATMENT AGENT, AND RUBBER PRODUCT

(75) Inventors: Satoru Kawaguchi, Hisai (JP); Kenichi Nakamura, Tsu (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 10/939,837

(22) Filed: Sep. 13, 2004

(65) Prior Publication Data

US 2005/0143521 A1 Jun. 30, 2005

Related U.S. Application Data

(63) Continuation of application No. PCT/JP03/03074, filed on Mar. 14, 2003.

(30) Foreign Application Priority Data

Mar. 14, 2002 (JP) .............................. 2002-069802

(51) Int. Cl.
  *C08J 5/07* (2006.01)
  *C08K 5/07* (2006.01)
  *C08L 5/07* (2006.01)

(52) U.S. Cl. .................. 524/354; 524/510; 524/100

(58) Field of Classification Search ................ 524/354, 524/100, 510
See application file for complete search history.

(56) References Cited

U.S. PATENT DOCUMENTS

| 3,814,713 A | * | 6/1974 | Honda et al. ............... 524/510 |
| 4,157,420 A | | 6/1979 | Bourrain et al. |
| 6,262,154 B1 | * | 7/2001 | Okamura et al. ........... 524/100 |
| 2005/0158531 A1 | | 7/2005 | Kawaguchi |

FOREIGN PATENT DOCUMENTS

| EP | 285 094 A2 | | 10/1988 |
| JP | 58-45940 A | | 3/1983 |
| JP | 1-221433 A | | 9/1989 |
| JP | 2-91135 A | | 3/1990 |
| JP | 06-212572 | * | 8/1994 |
| JP | 6-212572 | * | 8/1994 |
| JP | 6-212572 A | | 8/1994 |
| JP | 8-120573 A | | 5/1996 |
| WO | WO 03/072872 A1 | | 9/2003 |

* cited by examiner

*Primary Examiner*—David W. Wu
*Assistant Examiner*—Ives Wu
(74) *Attorney, Agent, or Firm*—Frishauf, Holtz, Goodman & Chick, P.C.

(57) ABSTRACT

There are provided a rubber-reinforcing glass fiber treatment agent capable of improving properties, in particular the oil resistance, of a rubber product, a rubber-reinforcing cord using the fiber treatment agent, and a rubber product having high oil resistance. The rubber-reinforcing glass fiber treatment agent consists essentially of a resorcin-formaldehyde water-soluble condensate and a butadiene-acrylonitrile copolymer latex; the butadiene-acrylonitrile copolymer latex has an acrylonitrile content of 31 to 55 wt % in terms of the weight of solids in the latex.

15 Claims, No Drawings

RUBBER-REINFORCING GLASS FIBER TREATMENT AGENT, RUBBER-REINFORCING CORD USING THE FIBER TREATMENT AGENT, AND RUBBER PRODUCT

CROSS REFERENCE TO RELATED APPLICATION

This application is a Continuation application of International Application PCT/JP03/03074 (not published in English) filed Mar. 14, 2003, the entire contents of which are hereby incorporated by reference herein.

TECHNICAL FIELD

The present invention relates to a rubber-reinforcing glass fiber treatment agent, a rubber-reinforcing cord using the fiber treatment agent, and a rubber product such as a timing belt or a tire containing the rubber-reinforcing cord.

BACKGROUND ART

Rubber-reinforcing cords comprised of a core comprised of glass fibers or organic fibers made of rayon, nylon, a polyester or the like, and a rubber coating on the surface of the core, containing resorcin-formaldehyde which has high affinity to the matrix rubber, are embedded in rubber products such as timing belts and tires. It is known that in the case that such a rubber product is placed under a high-temperature high-humidity environment, or is used in oil, the rubber coating rapidly deteriorates, resulting in a marked drop in the strength of the rubber product. Moreover, in the case that such a rubber product is used under a low-temperature environment, the matrix rubber and the rubber coating will break upon being subjected to impact due to being brittle, and hence there will again be a marked drop in the strength. For example, timing belts used in a cold region are used under a harsh environment, for example being subjected to impact while being still brittle upon engine startup, and then subsequently being subjected to a high temperature due to waste heat from the engine. In particular, in recent years there has been a trend toward further increasing the density in engine compartments, and hence timing belts are used under yet higher temperature environments.

The rubber coating is formed by applying a solution (hereinafter referred to as a "fiber treatment agent") containing an essential rubber component comprised of a resorcin-formaldehyde water-soluble condensate (hereinafter referred to as an "RF condensate"), and if appropriate another rubber component comprised of a hydrogenated butadiene-acrylonitrile copolymer latex, a vinylpyridine-styrene-butadiene copolymer latex or the like, and other components such as age resistors, emulsifiers and/or surfactants onto fibers that form the core, and drying and thus curing. Rubber-reinforcing cords obtained by impregnating such a fiber treatment agent into glass fibers are described in Japanese Laid-open Patent Publication (Kokai) No. H1-221433 and Japanese Laid-open Patent Publication (Kokai) No. H8-120573.

Glass fibers used as the core have properties such as having a high tensile strength, having a high modulus and hence little temperature dependence, exhibiting almost elastic deformation upon repeated stretching, and having good dimensional stability to moisture and heat. These properties are particularly desirable for a rubber-reinforcing cord. On the other hand, one of the serious drawbacks of glass fibers is being extremely weak to friction between filaments, resulting in the flexural fatigue resistance, which is an important property required of a rubber-reinforcing cord, being poor. Moreover, another drawback is that adhesiveness to rubber is poor. Consequently, in the case of using glass fibers in a rubber-reinforcing cord, to improve the adhesiveness to the matrix rubber, and to improve the flexural fatigue resistance, it is essential to form a rubber coating.

On the other hand, with a rubber-reinforcing cord in which organic fibers are used as the core, adhesiveness to the matrix rubber can be sufficiently secured through the fiber treatment agent only penetrating in two or three layers from the outermost layer of filaments (where a "filament" is the smallest fiber unit). In the case that the fiber treatment agent penetrates in as far as deep layers, the flexural fatigue resistance may conversely drop, and hence the attachment rate of the fiber treatment agent in the rubber-reinforcing cord is often adjusted to be not more than 10 wt % in terms of solids.

However, with a rubber-reinforcing cord in which glass fibers are used as the core, to prevent abrasion between filaments, it is necessary to make the fiber treatment agent penetrate in as far as the innermost layer of filaments, and hence the attachment rate of the rubber coating (the attachment rate in terms of solids after drying and curing) is necessarily increased to 15 to 25 wt %. A rubber-reinforcing cord in which glass fibers are used as the core is markedly different to a rubber-reinforcing cord in which organic fibers are used as the core in this respect. The properties of a rubber-reinforcing cord in which glass fibers are used as the core are thus greatly affected by the properties of the fiber treatment agent used in treating the core.

With regard to rubber-reinforcing cords in which glass fibers are used as the core, and a fiber treatment agent containing a nitrile group-containing copolymer latex is used as the fiber treatment agent, the present inventors carried out assiduous studies with an aim of improving various properties, and as a result, focusing on the type of the latex in the fiber treatment agent, in particular functional groups affecting the reactivity of the latex, discovered that the oil resistance of a rubber product can be markedly improved by specifying the type and content of the latex.

The present invention was accomplished based on this discovery. It is an object of the present invention to provide a rubber-reinforcing glass fiber treatment agent capable of improving the properties, in particular the oil resistance, of a rubber product, a rubber-reinforcing cord using the fiber treatment agent, and a rubber product having high oil resistance.

DISCLOSURE OF THE INVENTION

To attain the above object, in a first aspect of the present invention, there is provided a rubber-reinforcing glass fiber treatment agent consisting essentially of a resorcin-formaldehyde water-soluble condensate and a butadiene-acrylonitrile copolymer latex, wherein the butadiene-acrylonitrile copolymer latex has an acrylonitrile content of 31 to 55 wt % in terms of a weight of solids in the butadiene-acrylonitrile copolymer latex.

In the first aspect of the present invention, preferably, a content of the resorcin-formaldehyde water-soluble condensate is 3 to 35 wt % in terms of solids, and a content of the butadiene-acrylonitrile copolymer latex is 65 to 97 wt % in terms of solids, relative to the weight of total solids in the fiber treatment agent.

In the first aspect of the present invention, preferably, the total solid content of the fiber treatment agent is 15 to 35 wt %.

To attain the above object, in a second aspect of the present invention, there is provided a rubber-reinforcing cord obtained by treating glass fibers using a fiber treatment agent according to the first aspect of the present invention.

In the second aspect of the present invention, preferably, an attachment rate of the fiber treatment agent in terms of total solids is 10 to 30 wt %.

To attain the above object, in a third aspect of the present invention, there is provided a rubber product containing a rubber-reinforcing cord according to the second aspect of the present invention.

BEST MODE FOR CARRYING OUT THE INVENTION

A detailed description will now be given of a preferable embodiment of the present invention.

A fiber treatment agent according to the present embodiment consists essentially of a resorcin-formaldehyde condensate and a butadiene-acrylonitrile copolymer latex. The butadiene-acrylonitrile copolymer will have poor dispersibility in an aqueous solvent when alone, and hence only becomes a latex (a rubber component dispersed solution) upon being treated with, for example, a surfactant or an emulsifier. Such a surfactant or emulsifier, and other components such as an age resistor are only trace components in the butadiene-acrylonitrile copolymer latex, and hence their influence on a rubber-reinforcing cord can be ignored. The butadiene-acrylonitrile copolymer latex has an acrylonitrile content of 31 to 55 wt % in terms of the weight of solids in the latex. If the acrylonitrile content is less than 31 wt %, then little improvement will be seen in the oil resistance. On the other hand, if the acrylonitrile content exceeds 55 wt %, then the rubber-reinforcing cord will become hard, and hence will be prone to having an insufficient flexural fatigue resistance. Examples of such a butadiene-acrylonitrile copolymer latex are Nipol 1561 (trade name, made by ZEON Corporation, acrylonitrile content 45 wt %) and Nipol 1562 (same manufacturer, acrylonitrile content 33 wt %). A more preferable range for the acrylonitrile content is 33 to 45 wt %. It is specifically because the fiber treatment agent is a two-component system comprised of the RF condensate and the butadiene-acrylonitrile copolymer latex that the oil resistance of the rubber-reinforcing cord can be improved. This is a finding induced from the results of many experiments carried out by the present inventors.

It would be undesirable to use a hydrogenated butadiene-acrylonitrile copolymer instead of the above butadiene-acrylonitrile copolymer, since then the oil resistance of the rubber-reinforcing cord would drop.

The RF condensate can be obtained by reacting together resorcin and formaldehyde under the presence of an alkaline catalyst such as an alkali hydroxide, ammonia or an amine. Moreover, the RF condensate is preferably a water-soluble initial addition condensation product (resol) between resorcin and formaldehyde that has an abundance of oxymethyl groups, and preferably has a resorcin to formaldehyde molar ratio of 1:0.5~2.5. Moreover, RF condensates are commercially sold as resol type resins or novolak type resins, and these may also be used. Out of such commercially sold ones, a water-soluble type having a solid content of 5 to 10 wt %, particularly preferably 8 wt %, is preferable.

The content of the RF condensate in terms of solids relative to the weight of total solids in the fiber treatment agent is preferably 3 to 35 wt %. If this content is less than 3 wt %, then it will no longer be possible to attach the RF condensate onto the surface of the glass fibers uniformly, and hence the adhesion between the matrix rubber and the rubber-reinforcing cord will drop. On the other hand, if this content exceeds 35 wt %, then the rubber coating will become too hard, and hence the flexural fatigue resistance of the rubber-reinforcing cord will be prone to being insufficient. On the other hand, the content of the butadiene-acrylonitrile copolymer latex in terms of solids is preferably 65 to 97 wt %.

The solvent of the fiber treatment agent may be water only as conventionally, but to improve the dispersibility of the RF condensate and the butadiene-acrylonitrile copolymer latex, it is preferable to blend ammonia water into the water as appropriate.

The total solid content of the fiber treatment agent is preferably 15 to 35 wt %. The total solid content is proportional to the viscosity of the fiber treatment agent. Consequently, if this content is less than 15 wt %, then the viscosity of the fiber treatment agent will become too low, and hence it will become necessary to carry out application a plurality of times to sufficiently attach the RF condensate and the butadiene-acrylonitrile copolymer latex to the glass fibers, and thus the efficiency of production of the rubber-reinforcing cord will drop. On the other hand, if the total solid content exceeds 35 wt %, then the viscosity of the fiber treatment agent will become too high, and hence it will become difficult for the latex to reach as far as the innermost layer of glass fibers uniformly.

There are no particular limitations on the method of applying the fiber treatment agent onto the glass fibers, but in view of making the fiber treatment agent reach as far as the innermost layer of glass fibers, it is thought that an immersion method in which the glass fibers are immersed in the fiber treatment agent for a certain time period is best. Excess fiber treatment agent attached to the glass fibers after the glass fibers have been taken out from the fiber treatment agent is removed as appropriate, and then the glass fibers are heated, thus removing the solvent and promoting the polymerization reaction of the RF condensate and the butadiene-acrylonitrile copolymer latex, whereby a rubber coating is formed. Note that a sizing may or may not have been applied onto the glass fibers during spinning. A plurality of the glass fibers that have been coated with the rubber coating are placed together as appropriate, and twisting is carried out, whereby a rubber-reinforcing cord is formed.

The attachment rate of the fiber treatment agent in terms of total solids in the rubber-reinforcing cord is preferably 10 to 30 wt % relative to the total weight of the rubber-reinforcing cord having glass fibers as a core. If the attachment rate is less than 10 wt %, then the butadiene-acrylonitrile copolymer latex may not sufficiently reach as far as the innermost layer of glass fibers, and hence the flexural fatigue resistance of the rubber-reinforcing cord may drop. On the other hand, if the attachment rate exceeds 30 wt %, then beyond this the rubber coating will merely become thicker on the outermost layer of glass fibers, and hence there will be little improvement in the properties of the rubber-reinforcing cord.

Rubber-reinforcing cords are embedded in an unvulcanized matrix rubber using a known method, and then heating and vulcanization are carried out under pressure, thus producing a rubber product.

There are no particular limitations on the matrix rubber used in the rubber product; one having good adhesiveness to the RF condensate and the butadiene-acrylonitrile copolymer latex may be selected and used as appropriate. Preferable examples include chloroprene rubber, hydrogenated-nitrile rubber, and chlorosulfonated polyethylene rubber.

The rubber product is better in terms of various properties than a conventional rubber product containing rubber-reinforcing cords treated with a fiber treatment agent containing a plurality of types of latex, and has excellent oil resistance in particular. The rubber product can thus be suitably used as a timing belt for vehicle engines for which high oil resistance is required. Note that to cope with the increasing density of engine compartments and the accompanying temperature increase, in recent years a heat-resistant rubber such as chlorosulfonated polyethylene rubber or hydrogenated nitrile rubber has come to be used as the matrix rubber of timing belts. When embedding rubber-reinforcing cords in such a heat-resistant rubber, to improve the adhesiveness between the heat-resistant rubber and the rubber-reinforcing cords, the surface of each of the rubber-reinforcing cords may be treated with an adhesive treatment liquid containing a halogen-containing polymer or an isocyanate compound. A Chemlok (trade name, made by Lord Corporation) is preferable as such an adhesive treatment liquid.

The present invention will now be described yet more concretely through an example and comparative examples.

EXAMPLE 1

Alkali-free glass filaments of diameter 9 μm were spun, and several hundred of these were bound together using a sizing, thus preparing 33.7-tex glass fibers. Three of the glass fibers were combined, and the resulting core was immersed in a fiber treatment agent having the composition shown in Table 1 below, and then after being pulled out, excess fiber treatment agent was removed.

TABLE 1

|  | Total Component (Parts by Weight) | Solids (Parts by Weight) | Content in Terms of Solids (wt %) |
|---|---|---|---|
| Butadiene-Acrylonitrile Copolymer Latex (Nipol 1561, Solid Content 41 wt %, Acrylonitrile Content 45 wt %) | 90 | 40.5 | 90.5 |
| RF Condensate (Solid Content 8 wt %) | 50 | 4.0 | 8.9 |
| 25% Ammonia Water | 1 | 0.3 | 0.6 |
| Water | 25 | — | — |
| Total | 166 | 44.8 | 100.0 |

Note:
Total solid content of fiber treatment agent is 27.0 wt %

After that, the glass fibers were subjected to heat treatment at 250° C. for 2 minutes, thus completely removing the solvent, and hence forming a rubber coating. For the glass fibers coated with the rubber coating, the attachment rate of the fiber treatment agent in terms of total solids was measured using a known means to be 20 wt %. Next, primary twisting in the Z-direction (S-direction) of 2.1 twists per inch was applied to the glass fibers. 11 of the twisted glass fibers were then put together; and secondary twisting of 2.1 twists per inch was applied in the S-direction (Z-direction), whereby rubber-reinforcing cords of specification number ECG150 3/11 2.1 S(Z) were formed. A halogen-containing polymer adhesive liquid (obtained by diluting Chemlok 233 (trade name, made by Lord Corporation, solid content 23.5 wt %) with xylene) was applied uniformly onto the surface of each of the rubber-reinforcing cords, and heating was carried out to remove the solvent. The attachment rate of the adhesive in terms of solids was 3.5 wt % of the rubber-reinforcing cord including the adhesive after drying and curing.

The rubber-reinforcing cords were embedded using a known means into a matrix rubber having the composition shown in Table 2 below, and a toothed belt of width 19 mm and length 980 mm was formed.

TABLE 2

|  | Parts by Weight |
|---|---|
| Hydrogenated Nitrile Rubber (Zetpol 2020) | 100 |
| Carbon Black | 40 |
| Zinc Oxide | 5 |
| Stearic Acid | 1 |
| Thiokol (TP-95) | 5 |
| Sulfur | 0.5 |
| Tetramethyl Thiuram Disulfide | 1.5 |
| Cyclohexyl Benzothiazyl Sulfenamide | 1 |

The toothed belt was installed in a running test machine equipped with a driving motor at 6,000 rpm and 120° C., and a 504-hour running test was carried out with part of the belt (approximately 10% in the length direction) always immersed in engine oil. The length and tensile strength of the toothed belt were each measured before and after the test, and the elongation change and the strength retention rate were calculated. The calculation results are shown in Table 6 below. The calculation formulae were as follows.

Elongation change (%)={(length of belt after running test—length of belt before running test)/length of belt before running test}×100.

Strength retention rate (%)=(tensile strength after running test/tensile strength before running test)×100.

COMPARATIVE EXAMPLE 1

Rubber-reinforcing cords and a toothed belt were prepared as in Example 1 except that the fiber treatment agent shown in Table 3 below was used, and a running test was carried out. The results are again shown in Table 6 below.

TABLE 3

|  | Total Component (Parts by Weight) | Solids (Parts by Weight) | Content in Terms of Solids (wt %) |
|---|---|---|---|
| RF Condensate (Solid Content 8 wt %) | 30 | 2.4 | 8.4 |
| Vinylpyridine-Butadiene-Styrene Copolymer Latex (Nipol 2518FS, Solid Content 40 wt %) | 30 | 12.0 | 41.9 |
| Dicarboxylated Butadiene-Styrene Copolymer Latex (Nipol 2570X5, Solid Content 40 wt %) | 15 | 6.0 | 20.9 |
| Chlorosulfonated Polyethylene Latex (Esprene 200, Solid Content 40 wt %) | 20 | 8.0 | 27.9 |
| 25% Ammonia Water | 1 | 0.3 | 0.9 |
| Water | 4 | — | — |
| Total | 100 | 28.7 | 100.0 |

COMPARATIVE EXAMPLE 2

Rubber-reinforcing cords and a toothed belt were prepared as in Example 1 except that the fiber treatment agent shown in Table 4 below was used, and a running test was carried out. The results are again shown in Table 6 below.

COMPARATIVE EXAMPLE 3

Rubber-reinforcing cords and a toothed belt were prepared as in Example 1 except that the fiber treatment agent shown in Table 5 below was used, and a running test was carried out. The results are again shown in Table 6 below.

TABLE 4

| | Total Component (Parts by Weight) | Solids (Parts by Weight) | Content in Terms of Solids (wt %) |
|---|---|---|---|
| Butadiene-Acrylonitrile Copolymer Latex (Nipol LX513, Solid Content 45 wt %, Acrylonitrile Content 29 wt %) | 81 | 36.5 | 89.6 |
| RF Condensate (Solid Content 8 wt %) | 50 | 4.0 | 9.8 |
| 25% Ammonia Water | 1 | 0.3 | 0.6 |
| Water | 25 | — | — |
| Total | 157 | 40.7 | 100.0 |

Note:
Total solid content of fiber treatment agent is 27.0 wt %

TABLE 5

| | Parts by Weight |
|---|---|
| Resorcin-Formaldehyde Water-Soluble Condensate (R/F = 1/1.5, Solid Content 8 wt %) | 30 |
| Vinylpyridine-Butadiene-Styrene Terpolymer Latex (Nipol 2518FS, Solid Content 40 wt %) | 30 |
| Nitrile Group-Containing Highly Saturated Polymer Rubber Latex (Zetpol Latex 2020, Obtained by Hydrogenating Butadiene-Acrylonitrile Copolymer Rubber, Iodine Value 28, Solid Content 40 wt %) | 35 |
| Zinc Methacrylate | 0.6 |
| 25% Ammonia Water | 1 |
| Water | 4 |

Nipol 2518FS: MADE BY ZEON CORPORATION
Zetpol Latex 2020: MADE BY ZEON CORPORATION

TABLE 6

| | Elongation Change (%) | Strength Retention Rate (%) |
|---|---|---|
| Example 1 | −0.03 | 54 |
| Comparative Example 1 | −0.15 | 45 |
| Comparative Example 2 | −0.09 | 52 |
| Comparative Example 3 | −0.11 | 52 |

INDUSTRIAL APPLICABILITY

The present invention, constituted as described above, produces the following effects.

According to the fiber treatment agent of the present invention, the dispersed solution consists essentially of an RF condensate and a butadiene-acrylonitrile copolymer latex having a suitable acrylonitrile content. As a result, the components of the dispersed solution sufficiently reach as far as the innermost layer of glass fibers, and hence a rubber coating having high adhesiveness to the matrix rubber can be formed. Moreover, the rubber coating has higher adhesiveness to the matrix rubber than a conventional one having therein a plurality of types of latex.

Moreover, the contents of the RF condensate and the butadiene-acrylonitrile copolymer latex in terms of solids in the fiber treatment agent are adjusted such that the content of the RF condensate is 3 to 35 wt % in terms of solids, and the content of the butadiene-acrylonitrile copolymer latex is 65 to 97 wt % in terms of solids, relative to the weight of total solids in the fiber treatment agent. As a result, problems such as the rubber coating becoming too hard and the adhesiveness to the matrix rubber dropping can be prevented.

Moreover, the total solid content of the fiber treatment agent is adjusted to 15 to 35 wt %. As a result, the viscosity of the fiber treatment agent can be kept in an optimum range, and hence the fiber treatment agent can reliably be made to reach as far as the innermost layer of glass fibers.

Moreover, the rubber-reinforcing cord is manufactured using a fiber treatment agent as described above. As a result, various properties such as the heat resistance and flexural fatigue resistance can be improved, and in particular the oil resistance can be improved.

Moreover, the rubber product contains such rubber-reinforcing cords. As a result, a rubber product such as a timing belt for vehicle engines used under a harsh environment can be produced.

The invention claimed is:

1. A rubber-reinforcing glass fiber treatment agent consisting essentially of a resorcin-formaldehyde water-soluble condensate and a non-hydrogenated butadiene-acrylonitrile copolymer latex, wherein said non-hydrogenated butadiene-acrylonitrile copolymer latex has an acrylonitrile content of 31 to 55 wt % in terms of a weight of solids in said non-hydrogenated butadiene-acrylonitrile copolymer latex.

2. A rubber-reinforcing glass fiber treatment agent as claimed in claim 1, wherein a content of said resorcin-formaldehyde water-soluble condensate is 3 to 35 wt % in terms of solids, and a content of said non-hydrogenated butadiene-acrylonitrile copolymer latex is 65 to 97 wt % in terms of solids, relative to a weight of total solids in the fiber treatment agent.

3. A rubber-reinforcing glass fiber treatment agent as claimed in claim 1, wherein the total solid content of the fiber treatment agent is 15 to 35 wt %.

4. A rubber-reinforcing glass fiber treatment agent as claimed in claim 2, wherein the total solid content of the fiber treatment agent is 15 to 35 wt %.

5. A rubber-reinforcing cord obtained by treating glass fibers using a fiber treatment agent as claimed in claim 1.

6. A rubber-reinforcing cord as claimed in claim 5, wherein an attachment rate of the fiber treatment agent in terms of total solids is 10 to 30 wt %.

7. A rubber product containing a rubber-reinforcing cord as claimed in claim 5.

8. A rubber-reinforcing glass fiber treatment agent as claimed in claim 1, wherein said butadiene-acrylonitrile copolymer latex has an acrylonitrile content of 33 to 45 wt %.

9. A rubber-reinforcing glass fiber treatment agent as claimed in claim 1, wherein said resorcin-formaldehyde water-soluble condensate is obtained by reacting together resorcin and formaldehyde in the presence of an alkaline catalyst.

10. A rubber-reinforcing glass fiber treatment agent as claimed in claim 9, wherein the alkaline catalyst is selected from the group consisting of alkali hydroxide, ammonia and an amine.

11. A rubber-reinforcing glass fiber treatment agent according to claim 10, wherein a molar ratio of the resorcin to the formaldehyde is 1:0 to 2.5.

12. A rubber product produced by embedding one or more of the rubber-reinforcing cords as claimed in claim 5, in an unvulcanized matrix rubber and then heating and vulcanizing under pressure.

13. A rubber product as claimed in claim 12, wherein the matrix rubber is selected from the group consisting of chloroprene rubber, hydrogenated nitrile rubber and chlorosulfonated polyethylene rubber.

14. A rubber product comprising at least one rubber-reinforcing cord according to claim 5, embedded in a heat-resistant rubber selected from the group consisting of chlorosulfonated polyethylene rubber and hydrogenated nitrile rubber.

15. A rubber product as claimed in claim 14, wherein the surface of each of the rubber-reinforcing cords is treated with an adhesive treatment liquid containing a halogen-containing polymer or an isocyanate compound.

* * * * *